US005931307A

United States Patent [19]

Spradlin

[11] Patent Number: 5,931,307

[45] Date of Patent: *Aug. 3, 1999

[54] SELF SEPARATING FLATWARE AND METHOD FOR SORTING SAME

[76] Inventor: Lyndon D. Spradlin, 9N176 Rte. 59, Elgin, Ill. 60120

[ * ] Notice: This patent is subject to a terminal disclaimer.

[21] Appl. No.: 08/814,079

[22] Filed: Mar. 10, 1997

Related U.S. Application Data

[63] Continuation-in-part of application No. 08/498,680, Jul. 3, 1995, Pat. No. 5,655,663.

[51] Int. Cl.[6] .................................. B03D 1/00; A47J 43/28

[52] U.S. Cl. ......................... 209/172.5; 209/11; 209/173; 209/926; 30/147; 30/340

[58] Field of Search ..................................... 209/155, 172, 209/172.5, 173, 208, 926, 11; 30/142, 147, 322–328, 340, 342

[56] References Cited

U.S. PATENT DOCUMENTS

| | | | |
|---|---|---|---|
| 1,069,143 | 8/1913 | Keene . | |
| 1,386,956 | 8/1921 | Sanders . | |
| 3,331,507 | 7/1967 | Bossung . | |
| 3,483,877 | 12/1969 | Naslund . | |
| 3,738,465 | 6/1973 | Ettlinger et al. . | |
| 3,998,728 | 12/1976 | Strauss . | |
| 4,119,533 | 10/1978 | Saitoh et al. . | |
| 4,719,063 | 1/1988 | White . | |
| 4,750,621 | 6/1988 | Akesson et al. | 209/926 X |
| 4,759,841 | 7/1988 | Flodin . | |
| 5,117,928 | 6/1992 | Weihe . | |
| 5,655,663 | 8/1997 | Spradlin | 209/173 X |

FOREIGN PATENT DOCUMENTS

| | | |
|---|---|---|
| 2547474 | 5/1977 | Germany . |
| 639310 | 2/1994 | Japan . |

*Primary Examiner*—Tuan N. Nguyen
*Attorney, Agent, or Firm*—Meroni & Meroni

[57] ABSTRACT

Flatware that can be quickly and easily sorted when placed in a liquid solution, the flatware encompasses three classes, spoons, forks and knives. The spoons have a generally uniform buoyancy so as to float at a first level in the liquid solution, the forks have a generally uniform buoyancy so as to float at a second level in the liquid solution, and the knives have a generally uniform buoyancy so as to float at a third level in the liquid solution. The flatware floats at different levels in the liquid solution which provides the separation of the spoons, forks and knives in the liquid solution and enables the retrieval of the separated flatware in a sorted fashion. An additional method of sorting and removing the flatware from the liquid solution includes mixing in a prescribed amount of salt solution to the liquid solution and/or raising the temperature of the liquid solution a predetermined amount. The change in specific gravity of the liquid solution and/or the rise in temperature would enable one to make each class of flatware float to a top surface in the liquid solution at different intervals.

19 Claims, 3 Drawing Sheets

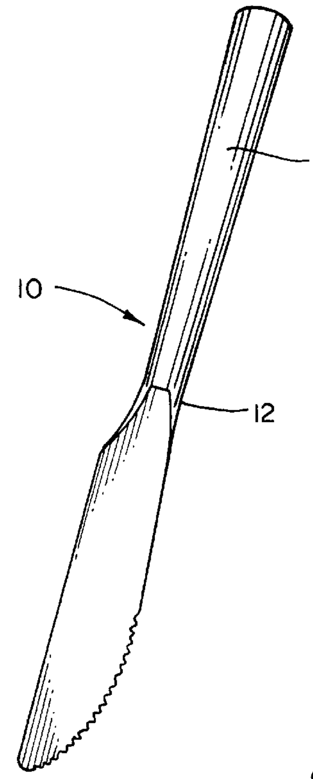
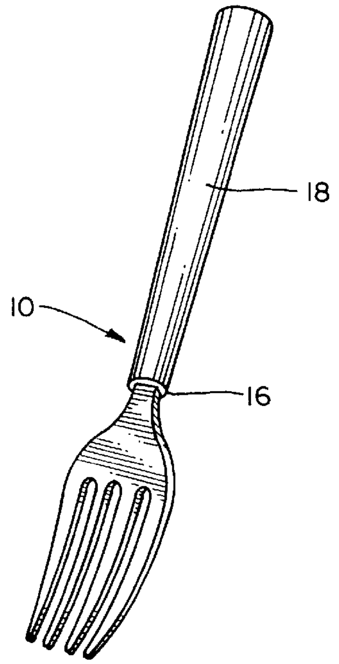
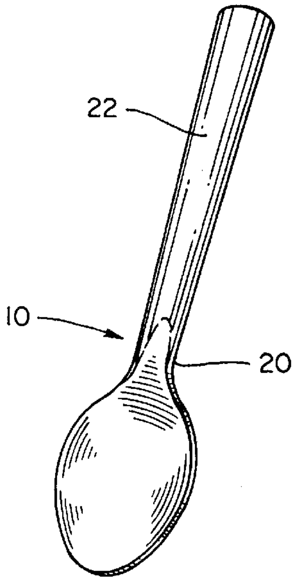
Fig. 3
Fig. 2
Fig. 1
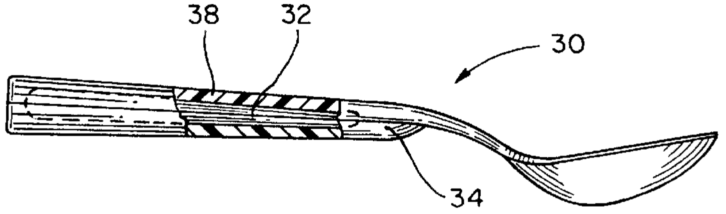
Fig. 4
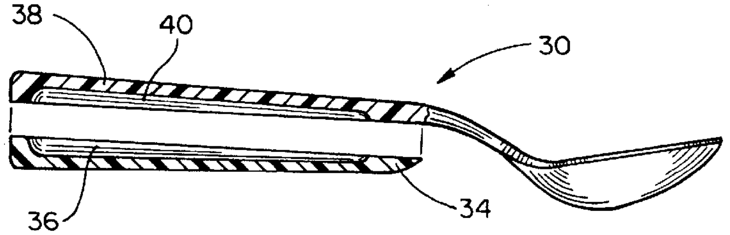
Fig. 5

SELF SEPARATING FLATWARE AND METHOD FOR SORTING SAME

This application is a Continuation-In-Part of my earlier filed U.S. application for patent entitled "Self Separating Flatware and Method For Sorting Same" filed on Jul. 3, 1995, and bearing U.S. Ser. No. 08/498,680, now U.S. Pat. No. 5,655,663.

BACKGROUND OF THE INVENTION

The present invention relates generally to low cost buoyant flatware, such as spoons, forks and knives, that can be quickly and easily sorted without spending the time to manually sort the flatware by hand. Cafeterias in governmental institutions, mental hospitals, mental health schools, offices and the like typically provide flatware for use with the meals that are served. The flatware is typically reusable since it can be expensive to constantly provide disposable flatware. Prior to this invention, after the flatware is used, the flatware is then typically washed and then sorted into containers for re-use. The sorting of the flatware in governmental institutions now commonly includes the hand labor of separating the spoons, forks and knives into containers and also orienting the flatware in one uniform direction. In a cafeteria where numerous meals are served, the sorting of the flatware can be very time consuming, especially if hundreds or thousands of meals are served on a daily basis. Some cafeterias may have flatware sorting machines, however, these machines can be very costly and are not always very reliable.

Using the buoyant flatware of the present invention involves placing the flatware in a tank containing a liquid solution such as water or soapy water. The flatware will then separate in the liquid solution and can then be removed in a sorted fashion without having to separate the flatware by hand or to have an expensive machine to separate the flatware. The flatware of the present invention can improve or eliminate mechanical sorting and can greatly improve the time of manually sorting the flatware. The sorting of the flatware can take place before or after washing the flatware.

The flatware sorting techniques disclosed in the prior art do not offer the flexibility and inventive features of my floating and quick sorting flatware. As will be described in greater detail hereinafter, the floating flatware of the present invention differs from those previously proposed.

SUMMARY OF THE INVENTION

According to my present invention I have provided flatware that can be quickly and easily sorted when placed in a liquid solution, the flatware comprises three classes, each of the three classes comprises spoons, forks and knives, each of the three classes having a generally uniform buoyancy, wherein the flatware has handles that are buoyant and each class of the flatware further floats in a common position in the liquid solution and enabling the retrieval of the separated flatware in a sorted fashion.

Another feature of my invention relates to the flatware described above, wherein one class of the flatware floats at a top surface portion in the liquid solution, a second class of flatware floats at a bottom portion in the liquid solution in such a manner so that the second class of flatware stands on one end in a vertical position, and a third class of said flatware lies flat at a bottom portion in the liquid solution.

Yet another feature of my invention relates to the flatware described above, wherein a prescribed amount of a salt solution is mixed into the liquid solution, the salt solution acting to change the specific gravity in the liquid solution, the prescribed amount of salt solution being sufficient to enable at least one of the three classes of flatware to rise from one level in the liquid solution to a second level in the liquid solution.

Still another feature of my invention relates to the flatware described above, wherein a temperature of the liquid solution is raised a predetermined amount, the rise in temperature being sufficient to enable at least one of the three classes of flatware to rise from one level in the liquid solution to a second level in the liquid solution.

According to important features of my invention I have also provided a method of sorting flatware in a liquid solution, the flatware comprising three classes, each of the three classes comprising spoons, forks and knives, each of the three classes further having a varying buoyancy so as to float at three different levels in the liquid solution, wherein the flatware has handles that are buoyant and each class of flatware further floats in a common position in the liquid solution the method comprising: placing the flatware in the liquid solution; removing the first class of flatware from the liquid solution; removing the second class of flatware from the liquid solution; and then removing the third class of flatware from the liquid solution.

Yet another feature of my invention concerns the method described above further including mixing a prescribed amount of salt solution into the liquid solution and/or raising the temperature of the liquid solution before the first class of flatware is removed from the liquid solution, the salt solution acting to change the specific gravity in the liquid solution, the prescribed amount of salt solution being sufficient to enable the first class of flatware to float to a top surface portion in the liquid solution.

Still another feature of my method described above includes mixing a prescribed amount of salt solution into the liquid solution and/or raising the temperature of the liquid solution after the first class of flatware is removed from the liquid solution, the salt solution acting to change the specific gravity in the liquid solution, the prescribed amount of salt solution being sufficient to enable the third class of flatware to stand on one end at a bottom portion in the liquid solution.

Other objects, features and advantages of my invention will become more readily apparent upon reference to the following description when taken in conjunction with the accompanying drawings, which drawings illustrate several embodiments of my invention.

DESCRIPTION OF THE DRAWINGS

FIG. 1 is a perspective view of a knife having a buoyant handle;

FIG. 2 is a perspective view of a fork having a buoyant handle;

FIG. 3 is a perspective view of a spoon having a buoyant handle;

FIG. 4 is a partial cross-sectional view of a spoon having a hollow handle embodying important features of my invention;

FIG. 5 is an exploded longitudinal view of a spoon embodying further features of my invention;

DETAILED DESCRIPTION OF THE PREFERRED EMBODIMENT

Figure 6:
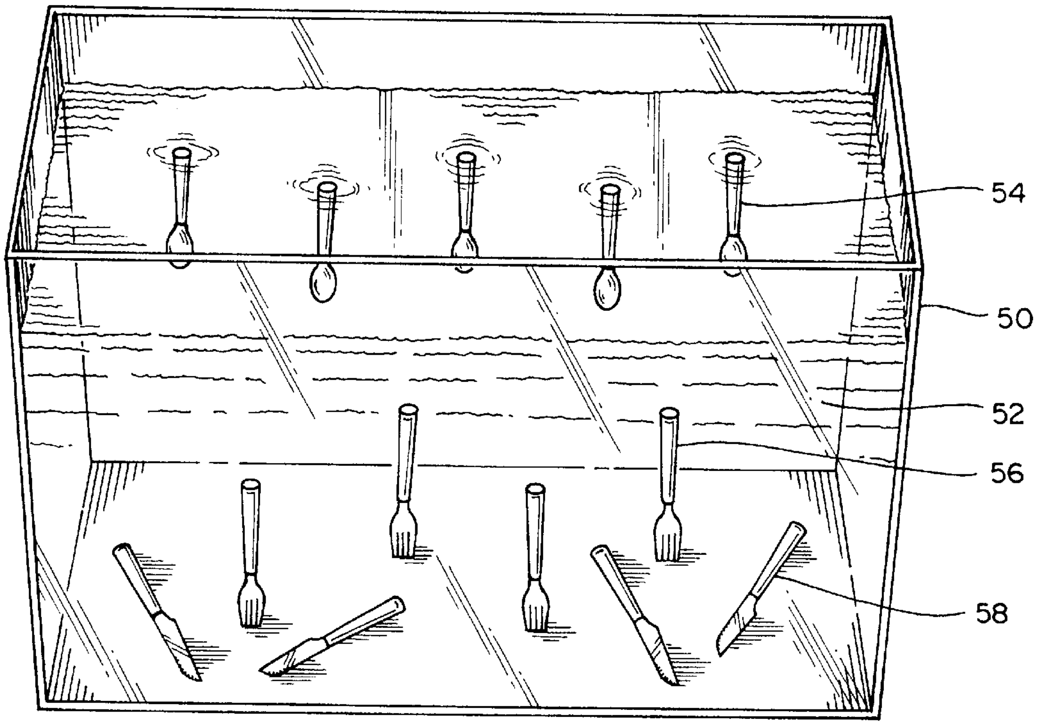
FIG. 6 is a perspective view of my buoyant flatware in a tank containing a liquid solution showing how my flatware is separated.

Referring now to the drawings, FIGS. 1–3 show my new and improved pieces of flatware 10. The flatware 10 consists of a knife 12 having a buoyant handle 14; a fork 16 having a buoyant handle 18; and a spoon 20 having a buoyant handle 22. The flatware 10 is designed and constructed in such a manner so that each class of flatware will float or sink at different levels or in a common position when placed in a liquid solution such as water. For example, the spoons 20 would be designed to float at an upper level in the water, the forks 16 would be designed to stand on end at a bottom level in the water and the knives 12 would be designed to sink to the bottom and lie flat at the bottom surface in the water.

FIGS. 4 & 5 illustrate one of many methods of constructing my separating flatware. The flatware 30 can be constructed by sealing an air pocket 32 within the handle. This can be accomplished by securing and sealing a handle cover 34 having an indented hollow portion 36 at one end thereof to the handle 38 of the flatware 30 with a waterproof adhesive. The handle 38 of the flatware can additionally have an indented hollow portion 40 to provide additional buoyancy in the flatware. The handle cover 34 is secured to the handle 38 of the flatware in such a manner that the hollow portions 36, 40 adjoin each other and are sealed inside the handle of the flatware, thereby creating a sealed air pocket 32. Each class of flatware may require a larger or smaller air pocket. For example, if the spoons were designed to float at a top portion in the liquid solution, then the spoons would have the most buoyant handle. If the forks were designed to stand on end at a bottom portion in the liquid solution, then the forks would have a less buoyant handle than the spoons. If the knives were designed to lie flat at the bottom portion in the liquid solution, then the knives would be have the least buoyant or non-buoyant handle.

Excellent results can be obtained if the flatware is made of plastic and weighing in the range of 0.4 to 0.7 ounces, however other suitable materials could also be used such as synthetic plastics, wood and metal. The construction of the flatware may have to be modified to provide a more buoyant handle if metal flatware is used or less buoyant if a light plastic is used. It is contemplated that the use of plastic flatware can be used in institutions, correctional facilities, prisons and the like since metal flatware could be more easily used as a dangerous weapon. However, if heavier flatware is used, such as metal, a buoyant device could possibly be attached to the handle of each piece of flatware (not shown). Various types of attachable floatation devices would include styrofoam, buoyant plastic, and other suitable materials that would be sufficient to make the flatware float. It is contemplated that the attached floatation devices could be permanently or temporarily affixed to each handle using a variety of different methods including, but not limited to: adhesive, clips, and elastic attachment. Furthermore, the attached floatation devices would not be too bulky so as to make it cumbersome for a user to utilize while eating with the flatware having the attached floatation device.

FIG. 6 further illustrates how my flatware is separated in a container 50 of a liquid solution 52, such as a sink filled with water. The spoons 54 are all designed to float in a vertical position at a top portion in the liquid solution with the handles pointed up. The forks 56 are designed to stand on end at a bottom portion in the liquid solution, and the knives 58 are designed to lay flat on the bottom of the container. The spoons 54 can then be easily removed at the same time without removing any forks 56 or knives 58. After the spoons are removed, the forks can then be removed by grabbing their handles. The removal of the spoons 54 and forks 56 provides sorting of the flatware and orientation of the flatware in one uniform direction with the handles being oriented on one side. Excellent results are obtained when the flatware is designed to float in the manner described above, however, each class of flatware, such as the spoons, can be designed to float at any level in the liquid solution.

Figure 7:
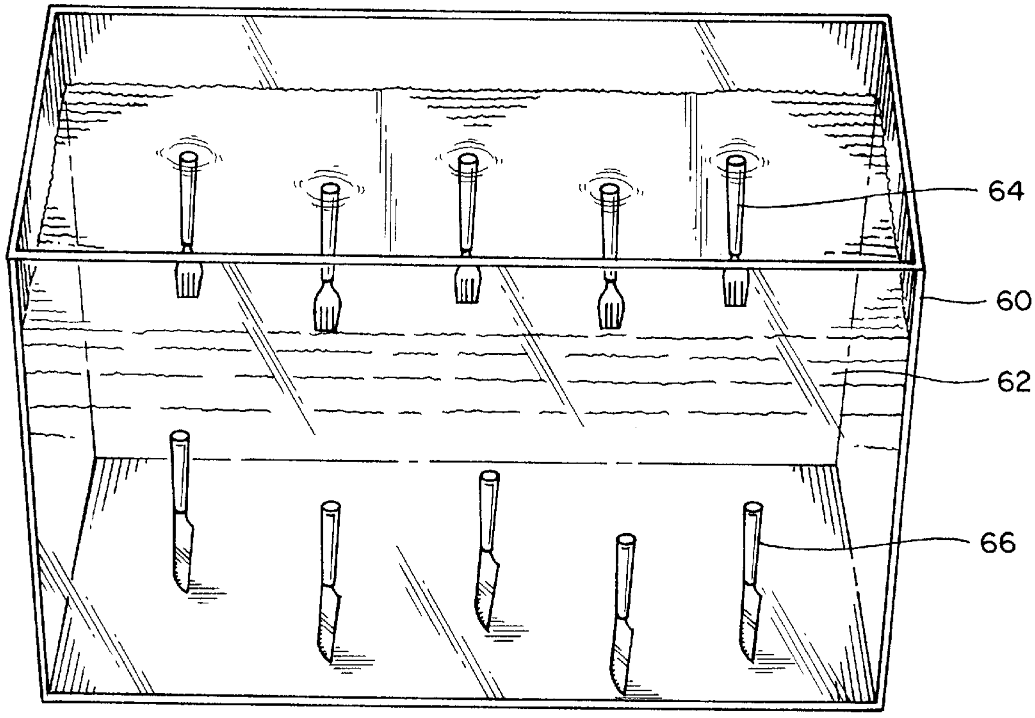
FIG. 7 is a perspective view of my buoyant flatware in a tank containing a modified type of liquid solution showing how my flatware is further separated and oriented.
Figure 8:
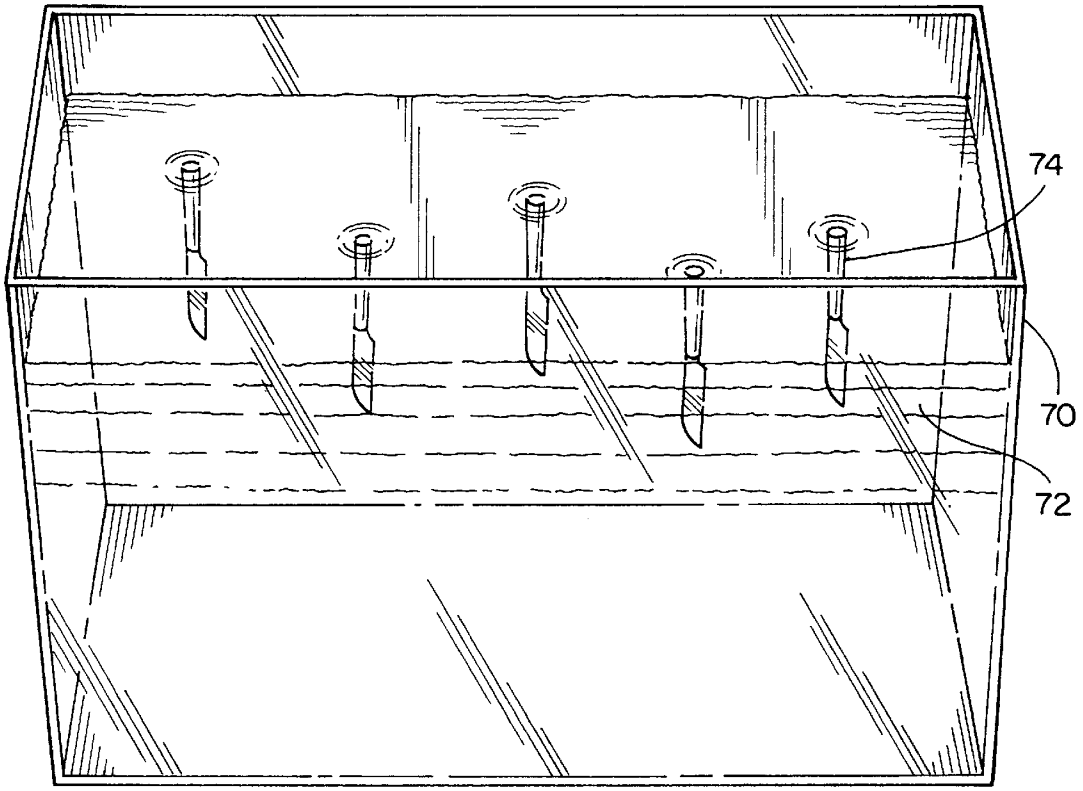
FIG. 8 is a perspective view of my buoyant flatware in a tank containing a modified type of liquid solution showing how yet another class of my flatware is further separated and oriented.

FIG. 7 illustrates how my flatware can be sorted in a modified way so that all three classes of flatware can be separated and sorted in one uniform direction so that the handles will be on one side. After the spoons are removed from the container 60 of liquid solution 62, a prescribed amount of salt or a salt solution can be added to the liquid solution 62 thereby changing the specific gravity of the liquid solution and making the liquid solution more dense. Excellent results can be obtained by adding 10 to 30 grams of salt per each gallon of the liquid solution while using plastic flatware that weighs approximately 0.4 to 0.7 ounces. Since the addition of salt makes the liquid solution more dense, the best results are obtained when 30 grams of salt per gallon are added to the liquid solution. This would then enable the forks 64 to float at a top portion in the liquid solution and would then enable the knives 66 to stand on end. The forks could then be removed with the handles being oriented in one uniform direction without accidentally picking up any knives. After the forks are removed from the container 70 (FIG. 8), additional salt solution can be added to the liquid solution 72 to make the knives 74 float at a top surface, then the knives could then be removed with the handles being oriented in one uniform direction.

Another method of being able to make a class of flatware rise from a bottom portion in the liquid solution to a top portion would be to increase the temperature of the liquid solution. The increased temperature in the liquid solution would in turn increase the temperature of the flatware. The increased temperature in the flatware would cause the air pocket or air pockets in the handles of the flatware to heat and expand thereby causing the handles of the flatware to be more buoyant and effectively being able to make a class of flatware rise from a bottom portion in the liquid solution to a top portion. Excellent results can be obtained by designing each class of flatware to change its floatation effect in a liquid solution, such as water, in 10–20 degree increments. For example, the flatware could be designed as follows:

TABLE 1

| Temperature of Liquid Solution | Characteristics of Flatware in a Liquid Solution (Water) |
|---|---|
| <70° F. | Knives lie flat on the bottom surface<br>Spoons stand on end (handles up) on the bottom surface<br>Forks stand on end (handles up) on the bottom surface |
| 100° F. | Knives lie flat on the bottom surface<br>Spoons float at the top surface (handles up)<br>Forks stand on end (handles up) on the bottom surface |
| 120° F. | Knives lie flat on the bottom surface<br>Spoons float at the top surface (handles up)<br>Forks float at the top surface (handles up) |
| 130° F. | Knives stand on end (handles up) on the bottom surface<br>Spoons float at the top surface (handles up)<br>Forks float at the top surface (handles up) |

TABLE 1-continued

| Temperature of Liquid Solution | Characteristics of Flatware in a Liquid Solution (Water) |
|---|---|
| >150° F. | Knives float at the top surface (handles up)<br>Spoons float at the top surface (handles up)<br>Forks float at the top surface (handles up) |

The removal of the flatware from the liquid solution can be done manually or mechanically with a machine. It is contemplated that the flatware would be sorted and separated before washing since the salt solution may need to be washed off. However, depending on how the cafeteria is organized, the separating and sorting of the flatware may take place after washing.

A further method of sorting the flatware would include combining the use of a salt solution and modifying the temperature of the liquid solution. The combined use of changing the specific gravity and increasing the temperature of the liquid solution could make it easier and more desirable for one to be able to sort and separate a group of flatware.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. In combination, a container, said container having a liquid solution therein, and flatware, said flatware designed to be quickly and easily sorted when placed in the liquid solution, said flatware comprising three classes, each of said three classes comprising spoons, forks and knives, each of said three classes having a generally uniform buoyancy, wherein said flatware has handles that are buoyant and each class of flatware further floats in a common position in the liquid solution and enabling the retrieval of the separated flatware in a sorted fashion.

2. The combination of claim 1, wherein one class of said flatware floats at a top surface portion in the liquid solution, a second class of flatware floats at a bottom portion in the liquid solution in such a manner so that the second class of flatware stands on one end in a vertical position, and a third class of flatware lies flat at a bottom portion in the liquid solution.

3. The combination of claim 2, wherein a prescribed amount of a salt solution is mixed into the liquid solution, said salt solution acting to change the specific gravity in the liquid solution, said prescribed amount of salt solution being sufficient to enable said second class of flatware to float from the bottom portion in the liquid solution to the top surface portion in the liquid solution.

4. The combination of claim 3, wherein a second prescribed amount of the salt solution is mixed into the liquid solution, said salt solution acting to change the specific gravity in the liquid solution, said second prescribed amount of salt solution being sufficient to enable said third class of flatware to stand on one at the bottom portion in the liquid solution.

5. The combination of claim 4, wherein a third prescribed amount of the salt solution is mixed into the liquid solution, said salt solution acting to change the specific gravity in the liquid solution, said third prescribed amount of salt solution being sufficient to enable said third class of flatware to float from the bottom portion in the liquid solution to the top surface portion in the liquid solution.

6. The combination of claim 1, wherein a prescribed amount of a salt solution is mixed into the liquid solution, said salt solution acting to change the specific gravity in the liquid solution, said prescribed amount of salt solution being sufficient to enable at least one of said three classes of flatware to rise from one level in the liquid solution to a second level in the liquid solution.

7. The combination of claim 1, wherein a temperature of the liquid solution is raised a predetermined amount, said rise in temperature being sufficient to enable at least one of said three classes of flatware to rise from one level in the liquid solution to a second level in the liquid solution.

8. The combination of claim 7, wherein a prescribed amount of a salt solution is mixed into the liquid solution, said salt solution acting to change the specific gravity in the liquid solution, said prescribed amount of salt solution being sufficient to enable at least one of said three classes of flatware to rise from one level in the liquid solution to another level in the liquid solution.

9. A method of sorting flatware in a liquid solution, said flatware comprising three classes, each of said three classes comprising spoons, forks and knives, each of the three classes further having a varying buoyancy so as to float at three different levels in the liquid solution, wherein the flatware has handles that are buoyant and each class of the flatware further floats in a common position in the liquid solution the method comprising:

placing the flatware in the liquid solution;

removing the first class of flatware from the liquid solution;

removing the second class of flatware from the liquid solution; and then removing the third class of flatware from the liquid solution.

10. The method of claim 9, further including:

mixing a prescribed amount of salt solution into the liquid solution before the first class of flatware is removed from the liquid solution, the salt solution acting to change the specific gravity in the liquid solution, the prescribed amount of salt solution being sufficient to enable the first class of flatware to float to a top surface portion in the liquid solution.

11. The method of claim 9, further including:

mixing a prescribed amount of salt solution into the liquid solution after the first class of flatware is removed from the liquid solution, the salt solution acting to change the specific gravity in the liquid solution, the prescribed amount of salt solution being sufficient to enable the second class of flatware to float to a top surface portion in the liquid solution.

12. The method of claim 9, further including:

mixing a prescribed amount of salt solution into the liquid solution after the first class of flatware is removed from the liquid solution, the salt solution acting to change the specific gravity in the liquid solution, the prescribed amount of salt solution being sufficient to enable the third class of flatware to stand on one end at a bottom portion in the liquid solution.

13. The method of claim 9, further including:

mixing a prescribed amount of salt solution into the liquid solution after the second class of flatware is removed from the liquid solution, the salt solution acting to change the specific gravity in the liquid solution, the prescribed amount of salt solution being sufficient to enable the third class of flatware to float to a top surface portion in the liquid solution.

14. The method of claim 9, further including:

raising the temperature of the liquid solution a predetermined amount before the first class of flatware is removed from the liquid solution, the rise in temperature being sufficient to enable the first class of flatware to float to a top surface portion in the liquid solution.

15. The method of claim 9, further including:

raising the temperature of the liquid solution a predetermined amount after the first class of flatware is removed from the liquid solution, the rise in temperature being sufficient to enable the second class of flatware to float to a top surface portion in the liquid solution.

16. The method of claim 9, further including:

raising the temperature of the liquid solution a predetermined amount after the first class of flatware is removed from the liquid solution, the rise in temperature being sufficient to enable the third class of flatware to stand on one end at a bottom portion in the liquid solution.

17. The method of claim 9, further including:

raising the temperature of the liquid solution a predetermined amount after the second class of flatware is removed from the liquid solution, the rise in temperature being sufficient to enable the third class of flatware to float to a top surface portion in the liquid solution.

18. The method of claim 9, further including:

mixing a prescribed amount of salt solution into the liquid solution and raising the temperature of the liquid solution before the first class of flatware is removed from the liquid solution, the salt solution acting to change the specific gravity in the liquid solution, the combination of the prescribed amount of salt solution and the rise in temperature being sufficient to enable the first class of flatware to float to a top surface portion in the liquid solution.

19. The method of claim 9, further including:

mixing a prescribed amount of salt solution into the liquid solution and raising the temperature of the liquid solution before the third class of flatware is removed from the liquid solution, the salt solution acting to change the specific gravity in the liquid solution, the combination of the prescribed amount of salt solution and the rise in temperature being sufficient to enable the third class of flatware to stand on one end at a bottom portion in the liquid solution.

* * * * *